United States Patent [19]
Blemberg

[11] Patent Number: 5,190,711
[45] Date of Patent: Mar. 2, 1993

[54] METHODS FOR PROCESSING POLYMERS

[75] Inventor: Robert J. Blemberg, Appleton, Wis.

[73] Assignee: American National Can Company

[21] Appl. No.: 687,765

[22] Filed: Apr. 18, 1991

Related U.S. Application Data

[63] Continuation of Ser. No. 204,485, Jun. 9, 1988, abandoned.

[51] Int. Cl.⁵ .................... B29C 47/06; B29C 47/92
[52] U.S. Cl. .................................. 264/171; 264/40.7;
425/133.5; 425/192 R; 425/462
[58] Field of Search ..................... 264/171, 40.7;
425/131.1, 133.5, 462, 466, 192 R

[56] References Cited

U.S. PATENT DOCUMENTS

| | | |
|---|---|---|
| 2,674,007 | 5/1954 | Allemann et al. . |
| 3,200,440 | 8/1965 | Bryan et al. ................. 18/8 |
| 3,217,734 | 11/1965 | Fitzgerald ................. 137/271 |
| 3,397,428 | 8/1968 | Donald . |
| 3,398,431 | 8/1968 | Corbett . |
| 3,415,920 | 12/1968 | Lee et al. . |
| 3,423,498 | 1/1969 | Lefevre . |
| 3,432,588 | 3/1969 | Breidt et al. .................. 264/171 |
| 3,448,183 | 6/1969 | Chisholm . |
| 3,477,099 | 11/1969 | Lee et al. . |
| 3,528,130 | 9/1970 | Lefevre et al. . |
| 3,558,330 | 7/1971 | Widiger et al. ............... 99/174 |
| 3,590,432 | 7/1971 | Schott, Jr. .................. 425/192 R |
| 3,833,704 | 9/1974 | Nissel .................... 264/171 |
| 3,918,865 | 11/1975 | Nissel . |
| 3,924,990 | 12/1975 | Schrenk ...................... 425/462 |
| 3,959,431 | 5/1976 | Nissel . |
| 4,165,210 | 3/1979 | Corbett ...................... 425/133.5 |
| 4,208,175 | 6/1980 | Rosenbaum ................ 425/462 |
| 4,265,693 | 5/1981 | Nishimoto . |
| 4,289,560 | 9/1981 | Simons ...................... 425/131.1 |
| 4,336,212 | 6/1982 | Yoshimura et al. ................. 264/22 |
| 4,379,117 | 4/1983 | Baird, Jr. et al. ................. 264/514 |
| 4,435,241 | 3/1984 | Corbett .................... 264/171 |
| 4,444,708 | 4/1984 | Gale . |
| 4,476,080 | 10/1984 | Komoda ................... 156/244.11 |
| 4,533,510 | 8/1985 | Nissel et al. . |
| 4,643,927 | 2/1987 | Luecke et al. ............... 428/36 |
| 4,708,615 | 11/1987 | Bethea et al. ............... 264/171 |
| 4,756,858 | 7/1988 | Reifenhäuser et al. ......... 425/131.1 |
| 4,804,510 | 2/1989 | Luecke et al. ............... 425/133.5 |
| 4,842,791 | 6/1989 | Gould et al. ............... 264/171 |

FOREIGN PATENT DOCUMENTS

| | | | |
|---|---|---|---|
| 671304 | 2/1966 | Belgium . | |
| 1948442 | 4/1971 | Fed. Rep. of Germany . | |
| 2554239 | 6/1977 | Fed. Rep. of Germany . | |
| 1489598 | 6/1972 | France . | |
| 2154579 | 5/1973 | France . | |
| 51-10863 | 1/1976 | Japan ................. | 425/133.5 |
| 57-80024 | 5/1982 | Japan ................. | 264/171 |
| 61-241121 | 10/1986 | Japan ................. | 425/133.5 |
| 61-241122 | 10/1986 | Japan ................. | 425/133.5 |

OTHER PUBLICATIONS

Patent Abstracts of Japan, vol. 12, No. 39, Feb. 5, 1988 & JPA 62 191 120 (Toshiba Mach. Co. Ltd.).
Multiphase Flow in Polymer Processing, Chang Dae Han 1981, Academic Press, N.Y., pp. 394-413.

Primary Examiner—Jeffery Thurlow
Attorney, Agent, or Firm—Robert A. Stenzel

[57] ABSTRACT

Method and apparatus for fabricating multiple layer sheet materials while minimizing the time during which a sensitive polymeric melt stream is in contact with metal. The method comprises encapsulating the sensitive melt stream with a second polymeric melt stream, preferably of a lower viscosity, at the outlet of the apparatus which produces the sensitive melt stream. When the encapsulating melt stream has a lower viscosity than the sensitive melt stream, a transport means is preferably employed between the encapsulating means and the die, whereby thickness variations about the circumference of the encapsulating melt stream are reduced.

23 Claims, 3 Drawing Sheets

METHODS FOR PROCESSING POLYMERS

This is a continuation of application Ser. No. 07/204,485 filed Jun. 9, 1988 now abandoned.

BACKGROUND OF THE INVENTION

This invention relates to novel methods for fabricating multiple layer polymeric sheet materials. It also relates to the novel apparatus used in practicing the novel methods herein, as well as to the sheet materials made therewith, and the packages made with those sheet materials.

Referring especially to the problem addressed in inventing the invention herein, vinylidene chloride copolymers (VDC) are preferred for their barrier properties to transmission of moisture vapor and oxygen.

It is commonly known that the extrusion of VDC copolymers is accompanied by a plurality of problems relating to the sensitivity of VDC copolymer to the combination of high temperature in contact with hot metal, and the time for which this high temperature contact must be maintained in the extrusion process.

So the extrusion of VDC copolymers to produce sheet materials has conventionally been accomplished by keeping the extrusion apparatus as close as possible to the die, or die feedblock, in order to minimize the time during which the VDC copolymer is exposed to the hot metal surfaces of the processing equipment. Accordingly the positioning of the VDC extruder as close as possible to the die or die feedback has more-or-less been required by this sensitivity of the VDC copolymer to the length of time during which it is exposed to the high temperature metal surfaces of the processing equipment.

Further, it is known to coextrude layers of, for example, polyethylene on either side of a VDC copolymer layer and then strip off the polyethylene layers to thus fabricate single layer VDC copolymer film. Such process, of course, provides a degree of protection for the VDC copolymer during the extrusion processing, by interposing the polyethylene between the hot metal surfaces of the die and the VDC copolymer.

It is also known to coextrude layers of other polymers with VDC copolymers, for example ethylene vinyl acetate copolymer (EVA). However, as additional layers are added to the coextrusion, additional space is required near the die to accommodate the additional equipments, such as extruders, mixers, transfer piping, die adapters, and the like. With anything more complex than fabrication of a simple 3-layer sheet, the area around the die can become quite congested. In arranging an equipment layout, and with all the polymer melt streams converging on the die, the space immediately adjacent the die is quite valuable. Thus the more versatility the layout designer has in arranging the space layout, the greater the opportunity for achieving efficiency in that layout.

Yet for coextrusions containing VDC copolymer, the VDC extruder has conventionally been positioned very close to the die equipment, as indicated above thus precluding the layout designer from choosing to use that space for anything else.

Thus it is an object of this invention to provide a method for fabricating multiple layer sheet material containing heat sensitive polymers while preserving the choice of where to locate the extruder which processes the sensitive polymer.

It is another object to provide novel apparatus for so fabricating such sheet materials.

It is still another object to provide such novel apparatus and methods at economical cost, and wherein the novel equipment is readily fabricated at economical cost.

It is yet another object to provide novel combinations of equipment to carry out the methods of the invention, in fabrication of novel sheet materials, and packages made therewith.

SUMMARY OF THE INVENTION

Certain embodiments of the invention comprise methods of fabricating a multiple layer sheet material. The first step of these methods comprises plasticating a first vinylidene chloride copolymer composition in extrusion apparatus and thereby forming a first polymer melt stream having a first viscosity. The first polymer melt stream is then annularly encapsulated in a second polymer melt stream having a second viscosity lower than the first viscosity by at least about 20 percent, in terms of poise, to thereby form a two layer composite melt stream, with the second melt stream forming a continuous layer about the circumference of, and positioned outwardly of, the first melt stream. The first melt stream of vinylidene chloride copolymer is thus completely enclosed by the second melt stream. The encapsulated composite melt stream is then fed into and through a transfer pipe of sufficient length and circumferential symmetry to reduce any thickness variations of at least about 10% in the second melt stream about the circumference of the composite melt stream, by at least about 50%.

Preferably the transfer pipe feeds the composite melt stream into and through an extrusion die.

Also preferably, the recited annularly encapsulating comprises passing the first melt stream through a central bore in a crosshead mandrel, and distributing and applying the second melt stream outwardly of the first melt stream, through an outwardly disposed annular channel in the crosshead mandrel.

In preferred embodiments of this invention, the composite melt stream is fed to a die adapted for fabricating a non-annular article, for example a flat sheet.

In other, and related, embodiments, the invention comprises methods of fabricating a multiple layer sheet material. The first step of the methods comprise plasticating a first polymer composition in extrusion apparatus and thereby forming a first polymer melt stream. The first polymer melt stream is then passed through a central bore in a crosshead mandrel and encapsulated in a second polymer melt stream by distributing and applying the second melt stream outwardly of the first melt stream, through an outwardly disposed annular channel in the crosshead mandrel. There is thereby obtained a composite melt stream comprising the first melt stream as its core with the second melt stream forming a continuous layer about the circumference of, and positioned outwardly of, the first melt stream. The encapsulated composite melt stream is then fed into and through an extrusion die.

Preferably the second melt stream has a viscosity lower than the viscosity of the first melt stream by a least about 20 percent, and the method includes feeding the composite melt stream to the extrusion die through a transfer pipe of sufficient length and symmetry to reduce any thickness variations of at least about 10% in the second melt stream about the circumference of the composite melt stream, by at least about 50%.

In those embodiments using a crosshead mandrel encapsulator, the crosshead mandrel typically produces a weld line in the second melt stream. The invention comprehends angularly orienting the location of feeding of the second melt stream into the crosshead mandrel, and relative to a non-annular die, such that the weld line passes through the die in an orientation advantageous for trimming of the weld line in a process subsequent to fabrication of the polymer article.

In some embodiments, the die comprises a slot die for fabricating sheet material, and the location of feeding of the second melt stream into the crosshead mandrel is angularly oriented, relative to the die, such that the weld line passes through the die in an orientation advantageous for trimming off the weld line during normal trimming off of the edge of the film sheet.

The encapsulation of the first polymer melt stream is preferably carried out as close as possible to the extrusion apparatus which produces the first polymer melt stream. Thus the encapsulating means is preferably attached to the extrusion apparatus, and the first melt stream is fed directly from the extrusion apparatus to the encapsulating means. The time that the first polymer melt stream is exposed to metal surfaces is thus minimized.

In those embodiments where the transfer pipe is utilized, it provides for flexibility in positioning the extrusion apparatus for the first melt stream, as well as reducing any thickness variations in the second melt stream about the circumference of the composite.

The invention also contemplates novel apparatus for fabricating polymeric articles with first and second melt streams. The apparatus comprises first and second extruders for plasticating first and second polymer compositions and producing first and second polymeric melt streams, and a die for molding the polymer melt streams into shapes. Between (i) the first and second extruders and (ii) the die, there is an encapsulation means comprising a central mandrel having a central bore, and a surrounding sleeve about the central mandrel, and including an annular crosshead channel between the central mandrel and the sleeve. The encapsulation means is adapted for (i) receiving the first polymer melt stream in, and passing the first polymeric melt stream through, the central bore and for (ii) receiving the second polymeric melt stream in the channel and forming an annular layer of the second polymeric melt stream about the first polymeric melt stream.

In preferred embodiments, the apparatus includes a transfer pipe between the adapter and the die, the transfer pipe being of sufficient length and symmetry to reduce any thickness variations of at least 10% in the second melt stream about the circumference of the combined melt streams, but at least about 50%, where the viscosity of the second melt stream is less than the viscosity of the first melt stream by 20 percent.

Also in preferred embodiments, the encapsulation means is mounted to the first extruder.

The invention comprehends novel sheet materials made with the apparatus and methods of the invention, and packages made with the sheet materials, the sheet materials are up to 0.100 inch thick, preferably up to about 0.060 inch, most preferably up to about 0.020 inch.

DETAILED DESCRIPTION OF THE ILLUSTRATED EMBODIMENTS

Figure 1:
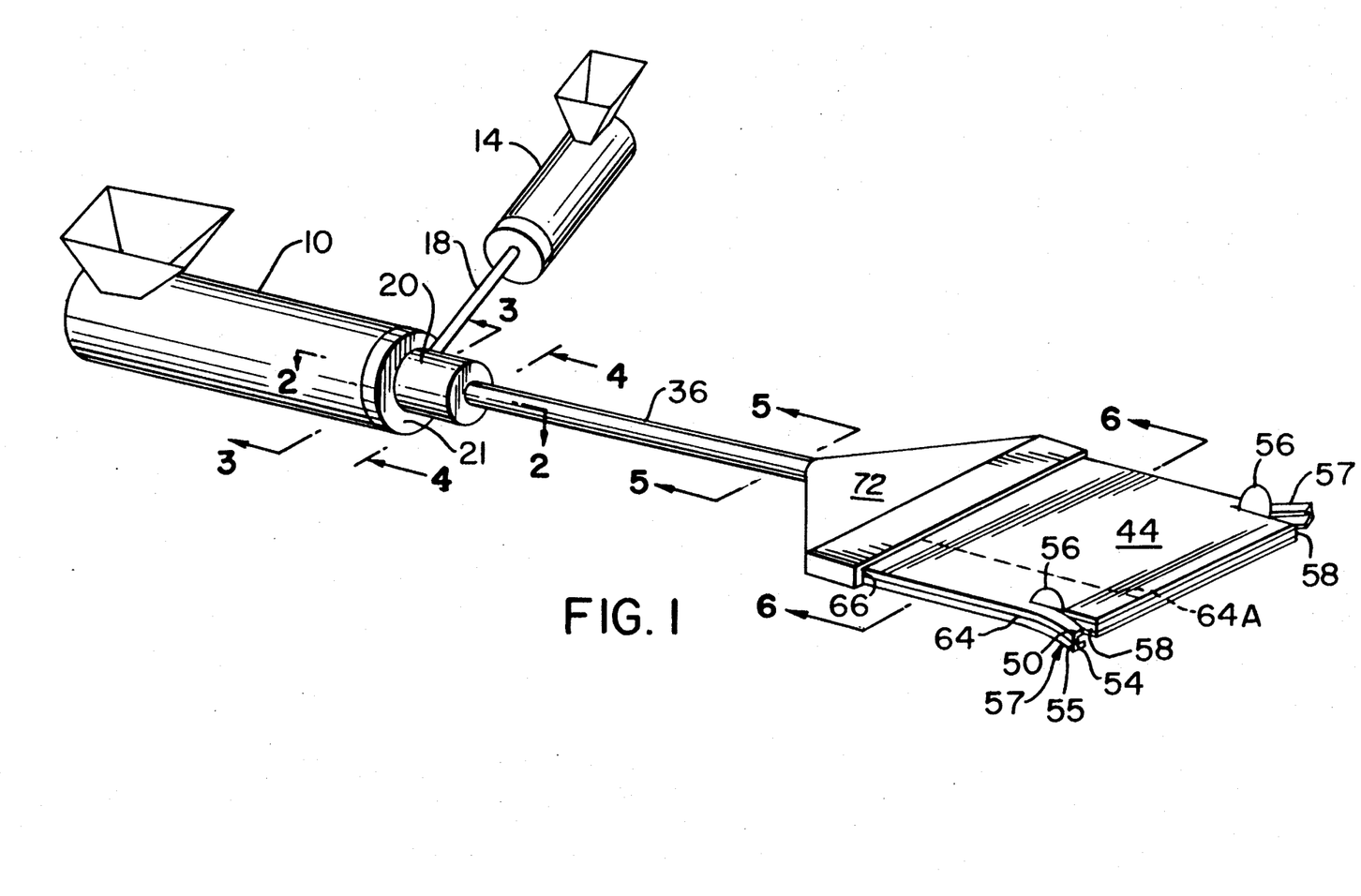
FIG. 1 shows a pictorial view of equipments and process using this invention.
Figures 2, 3:
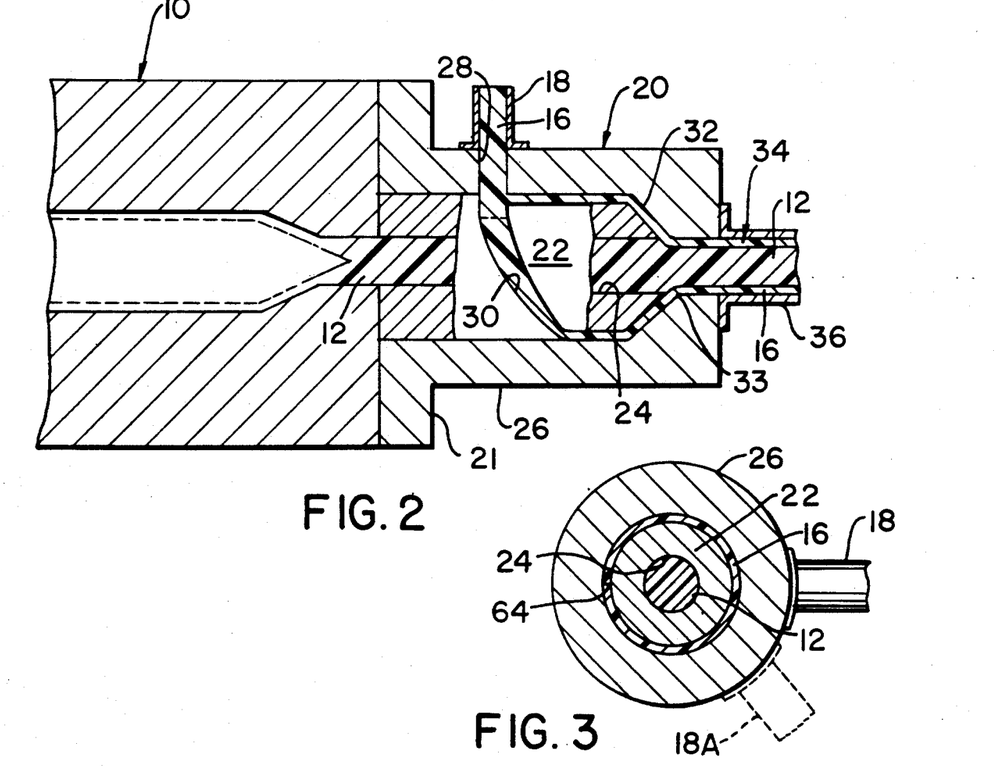
FIG. 2 shows a longitudinal cross-section of the encapsulator, and is taken at 2—2 of FIG. 1.
FIG. 3 shows a transverse cross-section of the encapsulator, and is taken at 3—3 of FIG. 1.

Referring to FIG. 1, a first extruder 10 plasticates a representative first polymeric composition of vinylidene chloride copolymer and produces a first polymeric melt stream 12, seen in FIG. 2. A second extruder 14 plasticates a second polymeric composition and produces a second polymeric melt stream 16 and delivers it, through a connecting conduit 18 to an encapsulator 20 which is mounted to first extruder 10 by means of a flange 21 and appropriate connectors.

Encapsulator 20 comprises a central crosshead mandrel 22 having a central bore 24 which receives first melt stream 12 from first extruder 10. Encapsulator 20 further comprises a sleeve 26 surrounding central mandrel 22. Sleeve 26 has an inlet passage 28 for passage of the second polymeric melt stream 16 into the encapsulator 20. Passage 28 leads to a crosshead channel 30 having a tapering cross-section about the circumference of mandrel 22. Channel 30 distributes polymer melt stream 16 about the circumference of mandrel 22 and between mandrel 22 and sleeve 26. Channel 30 leads to annular channel 32 which has a cross-section more approaching a constant with respect to its circumference at any given point.

Annular channel 32 leads to a joinder 33 with central bore 24, and delivers second polymer melt stream 16 to the joinder in an annular configuration having a generally constant cross-section.

With both melt streams 12 and 16 being supplied by their respective extruders 10 and 14 in constant flows of the melt streams, melt stream 12 is thus encapsulated in melt stream 16. Consequently, a composite melt stream 34 is formed from melt streams 12 and 16, wherein the second melt stream 16 forms a continuous layer about the circumference of, and positioned outwardly of, the first melt stream 12. Thus, the first and second melt streams 12 and 16 maintain their individual identity and first melt stream 12 is completely enclosed by the second melt stream 16.

The composite melt stream 34 exits encapsulator 20 and enters a transfer conductor which is shown in the illustrated embodiment as a pipe 36. It is desirable that the encapsulating second melt stream 16 have a uniform thickness about the circumference of the composite melt stream 34 for reasons which will be explained more fully hereinafter.

The uniformity of the thickness of melt stream 16 which is delivered to the joinder 33 depends on a plurality of contributing factors, for example the structures of crosshead channel 30 and annular channel 32, the particular polymer composition, and the thermal processing history of the polymer being used. An encapsulator, and especially channels 30 and 32, could be designed for each different polymer and each different process to be used for each polymer. Thus, all the desired parameters might be controlled through the encapsulator design. However, any change in the polymer or the process could require designing and building another encapsulator. To the extent flexibility in processing and in polymer selection is desired, the time and cost of providing the plurality of encapsulators to meet such needs would negatively impact efficient operation of the process. Thus, while it is important that melt stream 16 have a uniform thickness about the circumference of composite melt stream 34, it is also important that a single encapsulator 20 be useful for operations with a variety of polymers. Also, the operator needs a reasonable degree of freedom in the operation of both extruders 10 and 14, in order to provide an efficient operation. As the operator makes processing adjustments in the operation, whether by, for example, change of polymers or change of processing conditions with respect to melt stream 16, the rheology of the resulting melt stream 16 changes. As the rheology changes, so does the flow of melt stream 16 change about mandrel 22. As the flow of melt stream 16 about mandrel 22 changes, so can the distribution of material of melt stream 16 change about the circumference of mandrel 22.

Figure 4:
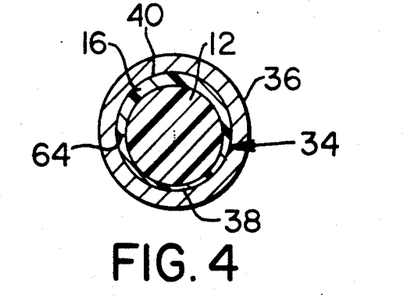
FIGS. 4, 4A, and 4B are taken at 4—4 of FIG. 1, and show exaggerated examples of non-concentricity in the composite encapsulated polymer melt stream as it leaves the encapsulator.
Figure 4A:
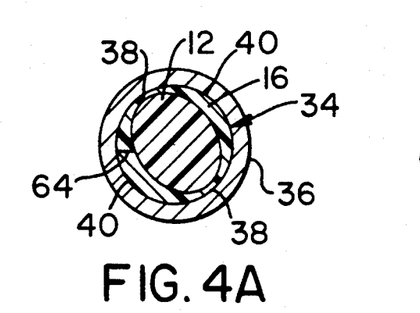
Figure 4B:
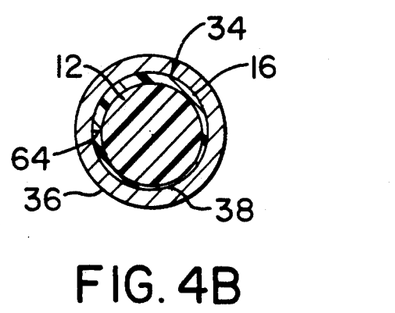
Figure 5:
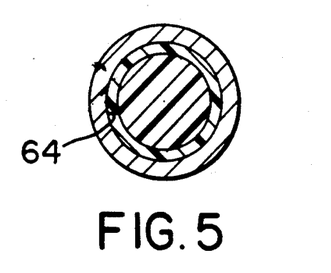
FIG. 5 is taken at 5—5 of FIG. 1, and illustrates the achievement of concentricity in the composite polymer melt stream in the sufficiently long transfer pipe.

So the material of melt stream 16 does not necessarily have a constant thickness about the circumference of composite melt stream 34 as it enters pipe 36, even though a constant thickness is desired. FIGS. 4, 4A, and 4B illustrate three types of non-uniformity which may be encountered. In FIGS. 4 and 4B, the first melt stream 12 is generally circular, but is off-centered in pipe 36, such that the corresponding second melt stream 16 has one thin area 38 and one thicker area 40 at an opposing location on the circumference. In FIG. 4A, the first melt stream is centered in pipe 36, but is avoid rather than circular. Correspondingly, the associated melt stream 16 has two thinner areas 38 and two thicker areas 40. Other illustrations of non-uniformity can, of course, be developed.

Returning now to FIG. 1, it is seen that transfer pipe 36 leads to a slot die 42 which converts the composite melt stream 34 into a flat sheet 44. The process of the invention is generally intended to be used for fabricating flexible packaging films, typically about 2 mils to about 10 mils thick. Thinner films may be made down to the normal minimum thicknesses generally fabricated using slot dies, such as about 0.25 to about 0.50 mil. However, the minimum thickness limitation in the process herein is controlled by die design, which forms no part of this invention. Thus, as die designs improve for thinner films, this invention is correspondingly useful.

Flexible packaging films do not normally exceed 20 mils thickness, so this is generally an upper limit for making flexible packaging films of this invention. However, thicker sectioned sheet materials may be used for application requiring more rigid properties. For example, thermoformed trays and other products are conventionally fabricated from sheet material about 60 mils to about 75 mils in thickness, in some cases up to about 100 mils thickness. While thicker sheets may be made using the invention, the advantages of the invention are not so readily discernible therein.

Figure 6:
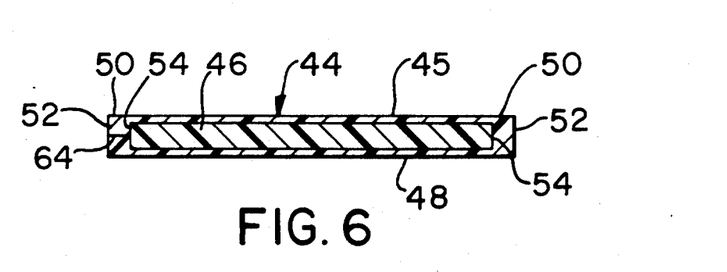
FIG. 6 is taken at 6—6 of FIG. 1, and shows and exaggerated cross-section of a sheet material fabricated in this invention.

FIG. 6 shows a cross-section of film 44, fabricated through slot die 42. The thicknesses of all three layers in FIGS. 1 and 6 are greatly exaggerated relative to the width in order that the layers might be visually illustrated. As seen in FIG. 6, the film 44 has a central core layer 46 which is comprised of the first melt stream 12. The second melt stream 16 still totally enclosed the first melt stream 12 which is now core layer 46, top and bottom layers 48 and edge portions 50 being derived from the second melt stream 16.

Referring again to FIG. 6, in order to produce a film having consistent and predictable properties, it is important that layers 48 be continuous and have a generally uniform thickness both longitudinally in the film, and transversely across the film sheet. Similarly, the widths of the two edge portions 50 between film edges 52 and the corresponding edges 54 of core layer 46 should be about equal, one with respect to the other, and should be the same along the length of the film so that cutting wheels 56 can be set to reliably cut away trim portions 57 of a reasonable width while reliably and reproducibly producing a film in which core layer 46 extends to both edges 58 of the trimmed film. Trim portions 57 include edge portions 50 as well as the outer edge portions of both edges of the core layer 46, i.e. extending from edges 54 toward the center of the sheet. Thus edge trim portions 57 include all of edge portions 50 plus a little of the edges of core layer 46, along with associated portions of stop and bottom layers 48.

Conventional fluid flow mechanics indicates that the distribution of the polymer melt stream 16 in the fabricated film 44 is representative of the distribution of the thickness of melt stream 16 as it enters the die 42. Thus, in order to obtain the same thicknesses in the top and bottom layers 48, it is important that the top and bottom portions of the composite melt stream have the same thicknesses in the outer encapsulating melt stream 16. A sheet made with, for example, the composite melt stream shown in FIG. 4 would have a thicker top layer 48 and a relatively thinner bottom layer 48. In a sheet made with the melt stream of FIG. 4A the top layer 48 would taper from thicker to thinner transversely across the film from right to left with respect to the direction seen in FIG. 6. Correspondingly, the bottom layer 48 would taper in the opposite direction.

In a sheet made with the composite melt stream of FIG. 4B, the thicknesses of the opposing edges 50 would be different; and the top and bottom layers would have different thicknesses, both of which would vary transversely across the sheet.

So it is important that any variations of at least about 20%, preferably at least about 10%, in the thickness of melt stream 16 about the circumference of the composite melt stream 34 be reduced by at least 50%, preferably at least 75%, most preferably at least 90% in magnitude, from the thickest portion of melt stream 16 to the thinnest portion.

Applicant has surprisingly found that variations in the thickness of encapsulating melt stream 16 may accordingly be reduced when the viscosity of melt stream 16 at the conditions of operation is less than the viscosity of melt stream 12, by at least 20 percent preferably at least about 30 percent. When the viscosities of the streams 12 and 16 are accordingly different, the applicant has surprisingly discovered that variations in the thickness of melt stream 16 can be reduced by passing the composite melt stream through a transport conductor having a symmetrical cross-section and a sufficient length. A typical transport conductor is the round transfer pipe 36 shown in FIG. 1. Other shapes are acceptable so long as they are symmetrical.

Given the viscosity differences required, the length of the transport conductor which is needed to effect the desired reduction in thickness variations is further a function of the cross-section of the transport conductor, both its shape and its size. For a round pipe as seen at 36 in FIG. 1, the required length is a function of the diameter, and can be expressed as a ratio of the length to the diameter (L/D ratio). While some improvement in concentricity is seen with an L/D ratio as small as 4/1, preferred ratios are at least 10/1, while most preferred ratios are at least 20/1. Effective lengths and corresponding effective diameters can now be determined for other conductor shapes by routine investigation.

With the transport means being able to bring the melt flow streams into a concentric relationship, concentricity at the output of the encapsulator is thus no longer critical. Furthermore, encapsulation of the sensitive VDC copolymer in an encapsulator mounted to the extruder enables the use of the transport means in order to achieve the concentricity provided in an appropriately designed transport means. Thus the combination of (i) the early encapsulation at or near the extruder and (ii) use of the elongated transport means after encapsulation, tends to automatically correct any non-concentricity which may exist in the composite melt stream 34 as it leaves encapsulator 20. The combination automatically adapts for processing changes and polymer changes, so long as the required viscosity relationships are observed. The longer the transport means, of course, the greater its versatility in adapting to change. However, since flow resistance increases with length, generally L/D ratios as for a pipe do not exceed about 100/1. Nevertheless, the transport means automatically corrects deficiencies in non-concentricity of the composite melt stream, within the capability provided by its length and symmetry, more or less independent of the processing conditions and the polymer compositions. The transport means is thus a means for providing improved concentricity to the encapsulated composite melt stream before it enters the die 42.

Figure 1A:
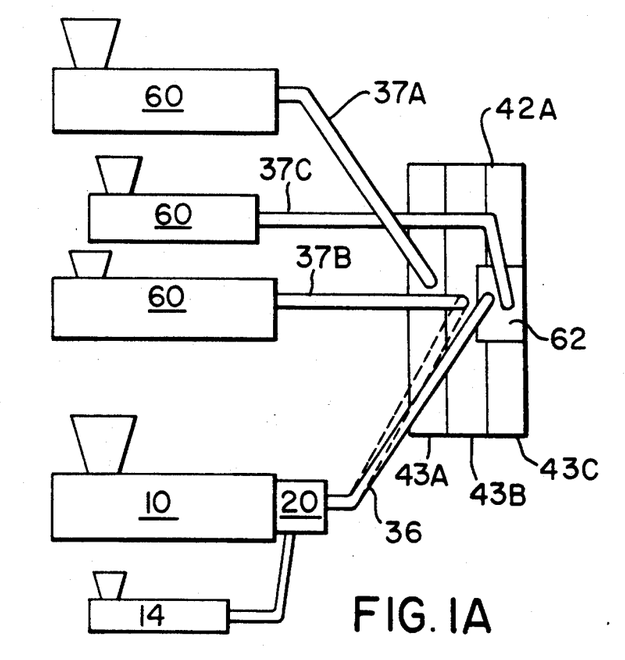
FIG. 1A shows a more typical equipment layout, which uses several extruders and illustrates the typical problem of congestion around the die.

The longer the transport conductor, of course the more flexibility the layout designer has in positioning extruders 10 relative to die 42. The FIG. 1 layout is, of course, quite simple. More typical is a layout for feeding several extruders into a die which produces a coextruded film having up to seven, or more, layers. Such a layout is seen diagrammatically in FIG. 1A, where three extruders 60, in addition to extruders 10 and 14 are feeding into a more complex multimanifold die 42A. FIG. 1A clearly illustrates the advantages of being able to move extruder 10 away from die 42A to avoid congestion. The freedom to so move extruder 10 is a direct result of the early encapsulation of melt stream 12 at the exit of extruder 10. FIG. 1A also illustrates that composite melt stream 34 from encapsulator 20 can be fed into a feedblock 62 to be combined with another melt stream before entering the die.

Another advantage of using the transport means, as at transfer pipe 36, is that it allows the user to feed the composite melt stream 34 into any manifold 43 of a multimanifold die, such as die 42A. 43A, 43B, and 43C in FIG. 1A indicate three manifolds three manifold of die 42A in FIG. 1A. Manifolds 43A and 43B are fed directly by transfer pipes 37A and 37B. Manifold 43C is fed by feedblock 62 which is fed by feed pipes 36 and 37C.

Where the extrusion processing equipment as in FIG. 1A is desirably used to produce a variety of coextruded film structures, another advantage of the use of transfer pipe 36, in connection with the heat sensitive melt stream 12, is that the composite melt stream 34 can easily be moved from one manifold to another between the film fabrication operations. For example, melt stream 34 may be fed to manifold 43C, as through feedblock 62 as shown in FIG. 1A to produce a first film structure. After the desired amount of the first structure has been produced, the process may be shut down, and transfer pipe 36 then moved to feed into manifold 43B, as indicated by the dashed outline in FIG. 1A. An appropriate feed or plug is into the vacated port in feedblock 62. Feed pipe 37B is repositioned as appropriate. The equipment can then be started up again, with the new melt stream feed arrangement, thus producing a different film layer structuring.

Thus the use of transfer pipe 36 between encapsulator 20 and the multimanifold die 42A allows the sensitive melt stream 12 to be fed into any one of the die manifolds. This gives the user the freedom to put the layer produced by the sensitive polymer melt stream at virtually any locations in the film structure, such that the sensitive layer may be positioned near the center of the film, or toward either surface, where the die contains at least three manifolds. Thus use of transfer pipe 36 enables the production of a wide variety of film structures with movement of only the transfer pipe 36. In the conventional alternative, and where the encapsulator is mounted to both the die and its respective extruder, no corresponding movement to a different die manifold can readily be achieved.

It is contemplated that the composition of the sensitive melt stream will generally comprises a vinylidene chloride copolymer. However, a variety of vinylidene chloride copolymer are known and used. So the sensitive polymer compositions may differ in the different film structures which can advantageously be made with this invention. Accordingly, when a multimanifold die is used, and the transfer pipe 36 is moved among the die manifolds in feeding sensitive polymer composition to the different manifolds to produce different film structures, different ones of the sensitive polymer compositions can be selected, especially according to the properties desired in the film structures. Corresponding differences in encapsulation polymer compositions are also contemplated.

In each structure, and irrespective of which manifold receives the encapsulated sensitive polymer, the sensitive polymer layer in the film structure does have layers of the encapsulating polymer on both of its surfaces.

The encapsulation process of this invention is advantageous for use with any material which is sensitive to the processing parameters to be used. This can facilitate the coextrusion, for example, of materials having disparate extrusion temperatures where the more heat tolerant material comprises melt stream 16. In this case melt stream 16 serves as a thermal cushion with respect to melt stream 12.

This invention is especially useful in the extrusion of polymers which are sensitive to exposure to metal at the high temperature which are used in extrusion processing. For example, vinylidene chloride copolymers are sensitive to exposure to high temperature over a prolonged period of time of more than a few seconds, and especially when they are concurrently exposed to the methyl surfaces of the processing equipment.

Extrusion processing of such materials as vinylidene chloride vinyl chloride copolymer and vinylidene chloride methylacrylate copolymer are known to require periodic shut downs because of polymer degradation, with corresponding disassembly and cleaning of the processing equipment. These costly procedures are required even though the extruder processing the vinylidene chloride copolymer typically is arranged to feed directly into the die without an intervening transfer pipe. Using the processes of the invention, the sensitive vinylidene chloride copolymer is processed in extruder 10 to produce melt stream 12, and is encapsulated preferably right at the extruder exit, whereby its time of exposure to high temperature in combination with die metal contact is minimized. Once the sensitive vinylidene chloride copolymer is encapsulated by the less sensitive material of melt stream 16, its exposure to the metal surfaces of the processing equipment is, of course, essentially eliminated. The sensitivity of a given material may be respective to all extrusion processing, as with the vinylidene chloride copolymers, or it may pertain, for example, to disparate extrusion processing of different materials. Thus the encapsulation process can enable the coextrusion processing of some materials which cannot normally be coextruded; and wherein the more heat tolerant material serves, in melt stream 16, as a thermal cushion for the more heat sensitive material in melt stream 12.

The benefits of this invention are especially seen to apply when the material in the first melt stream 12 is a vinylidene chloride copolymer. Copolymers comprising comonomers of vinyl chloride and methylacrylate will benefit most since they are now in more common use. However, the other sensitive ones of the vinylidene chloride copolymer family will also be benefitted by use of this invention.

The encapsulator 20 is relatively simple in design, and is economically fabricated with conventional turning and boring equipment. The crosshead design for distributing melt stream 16 is especially simple and straight forward. With respect to fabrication of thinner section sheets, central bore 24 is seen as an element in combining of melt streams to make a non-annular article, such as sheet 44.

Turning now to FIG. 2, as melt stream 16 enters crosshead channel 30, it splits into two stream components and flows around mandrel 22 in radially opposite directions. Portions of those stream components meet on the opposite side of crosshead channel 30, from passage 28, forming weld line 64. While weld line 64 has only modest affect on the functional properties of sheet material 44, in general, it is usually preferred that weld line 64 be omitted from that portion of the sheet material which it is anticipated will be used. Thus, the location of feeding of the melt stream 16 into the crosshead mandrel 22 is oriented, relative to die 42 such that the weld line 64 passes through die 42 in an orientation advantageous for trimming off the weld line in a process subsequent to fabrication of the sheet article 44. Such a process is seen at cutters 56 which are shown trimming the sheet in a converting process which is practiced immediately after fabrication of the sheet. The trimming could, of course, be performed at a later time.

As seen in FIG. 1, the second melt stream 16 is fed into encapsulator 20 essentially radially opposite an edge 66 of die 42, considered in light of a central axis (not shown) which passes through encapsulator 20, pipe 36 and die 42. The location of feed passage 28, and thus weld line 64 is angularly oriented relative to die 42, when encapsulator 20 is mounted to extruder 10. That orientation can be changed by detaching encapsulator 20 from extruder 10, rotating it about its longitudinal axis to the desired angular orientation, and remounting it to extruder 10. Such an alternate positioning of inlet passage 28 is seen in FIG. 3, in dashed outline of the corresponding positioning of conduit 18A. The corresponding weld line is shown as a dashed line at 64A in FIG. 1. If desired, a rotatable fluid coupling between extruder 10 and encapsulator 20 could also be employed.

Figure 7:
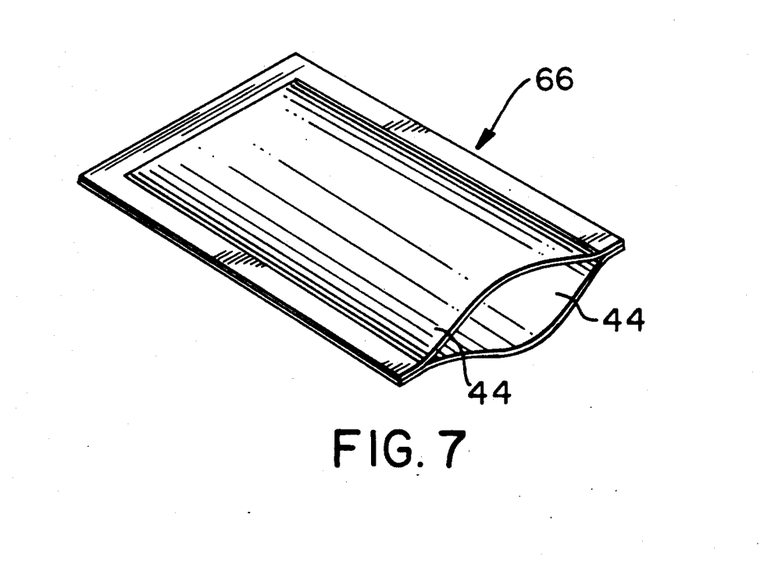
FIG. 7 shows a pictorial view of a pouch made with flexible sheet material made according to the invention.

The sheet materials of this invention can readily be fabricated into packages by any process which could conventionally be used for conventional sheet material of similar compositions and layer thicknesses but made without utilizing this invention. As example of such packages is the pouch 66 seen in FIG. 7, which is comprised of facing portions of sheet material 44 made according to the invention and heat sealed to each other about contiguous portions thereof to make a pouch closed on three sides and open on the fourth side to receive a product.

EXAMPLE

A three layer film comprising a core layer of vinylidene chloride methylacrylate copolymer and outer layers of ethylene vinyl acetate copolymer was fabricated. A first polymeric composition comprising vinylidene chloride methylacrylate copolymer was plasticated in a first extruder to form a first polymeric melt stream. A second composition of ethylene vinyl acetate copolymer (EVA) was plasticated in a second extruder to form a second polymeric melt stream. The vinylidene chloride methylacrylate copolymer was Dow 119, having a viscosity at 150° C. and shear rate of 10 sec.−1 of about $2.7 \times 10^4$ poise. The ethylene vinyl acetate copolymer was Exxon LD-761, having a viscosity of about $1.6 \times 10^4$ poise at 180° C. and shear rate of 10 sec.−1. The temperature at the outlet of the first extruder was 153° C. The temperature at the outlet of the second (EVA) extruder was 180° C. The melt stream of vinylidene chloride copolymer was fed through the central bore of a crosshead encapsulator mounted to the exit end of its extruder. The melt stream of EVA was fed through a crosshead mandrel of the encapsulator and joined to the first melt stream, as an outward, encapsulating layer, to make the composite melt stream as seen at 34 in FIG. 2. The feed location in the crosshead mandrel was axially opposite an edge of the slot die being used. The composite melt stream was fed from the encapsulator through a 0.625-inch inside diameter round pipe 42 inches long, to the slot die. The melt stream was fabricated, in the die into a sheet approximately 54 inches wide by about 2 mils thick. Three inches of edge trim were taken on each side, and included trimming off the weld line, leaving a finished sheet 48 inches wide, with no weld line, with all three layers reaching both edges of the film. The outer layers were each about 0.01 mil thick. The outer layer were continuous and of uniform thickness. The balance of the thickness of the film comprised the core layer of vinylidene chloride copolymer.

Thus the invention provides methods for fabricating multiple layer sheet material containing sensitive polymers while preserving the choice of where to locate the extruder which processes the sensitive polymer.

The invention also provides novel apparatus for so fabricating such sheet materials.

The invention further provides such novel apparatus at economical cost, and wherein the novel equipment is readily fabricated at economical cost.

The invention still further provides novel combinations of equipment to carry out the methods of the invention, in fabrication of novel sheet materials, and packages made therewith.

Those skilled in the art will now see that certain modifications can be made to the apparatus and methods, and the resulting films and packages, herein disclosed with respect to the preferred embodiments, without departing from the spirit of the instant invention.

And while the invention has been described above with respect to its preferred embodiments, it will be understood that the invention is capable of numerous rearrangements, modifications and alterations and all such rearrangements, modifications and alterations are intended to be within the scope of the appended claims.

Having thus described the invention, what is claimed is:

1. A method of processing polymers comprising:
   (a) plasticating a first polymeric composition and thereby forming a first polymeric melt stream having first viscosity;
   (b) encapsulating said first polymeric melt stream in a second melt stream having a second viscosity lower than said first viscosity by at least about 20 percent, to thereby form a composite melt stream, with said second melt stream forming a continuous layer about the circumference of, and positioned outwardly of, said first melt stream, said first melt stream being completely enclosed by said second melt stream; and
   (c) passing said composite melt stream into and through a transfer means of sufficient length and symmetry to reduce any thickness variations of at least 10% in said second melt stream about the circumference of said composite melt stream by at least about 50% of the variation
   (d) feeding said composite melt stream through an extrusion die.

2. A method as in claim 1 and including the step of feeding said composite melt stream into and through an extrusion die.

3. A method as in claim 2 wherein said encapsulating comprises annularly encapsulating by passing said first melt stream through a central bore in a encapsulator mandrel, feeding said second melt stream through an outwardly disposed annular channel in said encapsulator, to a point of joinder of said annular channel and said central bore, and thereby distributing and applying said second melt stream outwardly of said first melt stream.

4. A method as in claim 2 and including feeding said composite melt stream to a die adapted for fabricating a non-annular article.

5. A method as in claim 3 and including feeding said composite melt stream to a die adapted for fabricating a non-annular article.

6. A method of fabricating a multiple layer sheet material, comprising:
   (a) encapsulating a first polymeric melt stream in a second polymeric melt stream by passing said first polymeric melt stream through a central bore in an encapsulator, passing the second polymeric melt stream through a crosshead channel in said encapsulator which feeds said second polymeric melt stream to an annular channel in said encapsulator which circumferentially joins said central bore thereby distributing and applying said second melt stream outwardly of said first melt stream to thereby obtain a composite melt stream comprising said first melt stream as a core, with said second melt stream forming a continuous layer about the circumference of, and positioned outwardly of, said first melt stream;
   (b) passing said composite melt stream into and through a transfer means of sufficient length and symmetry to reduce any thickness variations of at least 10% in said second melt stream about the circumference of said composite melt stream, by at least 50% of the variation; and
   (c) feeding said composite melt stream into and through an extrusion die.

7. A method as in claim 6, said second melt stream having a viscosity lower than the viscosity of said first melt stream by at least about 20 percent, and including feeding said composite melt stream to said extrusion die through a transfer pipe of sufficient length and symmetry to reduce any thickness variations of at least 10% in said second melt stream about the circumference of said composite melt stream, by at least about 50%.

8. A method as in claim 6 and including feeding said composite melt stream to a die adapted for fabricating a non-annular article.

9. A method as in claim 7 and including feeding said composite melt stream to a die adapted for fabricating a non-annular article.

10. A method as in claim 5, said encapsulator producing a weld line in said second melt stream, and including angularly orienting the location of feeding of said second melt stream into said encapsulator, and relative to said die, such that said weld line passes through said die in an orientation advantageous for trimming off said weld line in a converting process performed subsequent to fabrication of said sheet material.

11. A method as in claim 6, said encapsulator producing a weld line in said second melt stream, and including angularly orienting the location of feeding of said second melt stream into said encapsulator, and relative to said die, such that said weld line passes through said die in an orientation advantageous for trimming off said weld line in a process performed subsequent to fabrication of said sheet material.

12. A method as in claim 5, said die comprising a slot die for fabricating sheet material, said encapsulator producing a weld line in said second melt stream, and including angularly orienting the location of feeding of said second melt stream into said encapsulator, and relative to said die, such that said weld line passes through said die in an orientation advantageous for trimming off said weld line during the normal trimming off of the edge of said sheet.

13. A method as in claim 6, said die comprising a slot die for fabricating sheet material, said encapsulator producing a weld line in said second melt stream, and including angularly orienting the location of feeding of said second melt stream into said encapsulator, and relative to said die, such that said weld line passes through said die in an orientation advantageous for trimming off said weld line during the normal trimming off of the edge of said sheet.

14. A method as in claim 2, said plasticating is of a vinylidene chloride copolymer composition and is performed in extrusion apparatus, and including encapsulating said first polymeric melt stream of vinylidene chloride copolymer in encapsulating means attached to said extrusion apparatus, and wherein said first melt stream is fed directly from said extrusion apparatus to said encapsulating means, whereby time of exposure of said vinylidene chloride copolymer to metal surfaces is minimized while the utilization of said transfer means provides for the combination of improvements of (i) flexibility in positioning said extrusion apparatus, and (ii) reduction of any thickness variations in said second melt stream about the circumference of said composite melt stream.

15. A method as is claim 3, said plasticating is of a vinylidene chloride copolymer composition and is performed in extrusion apparatus, and including encapsulating said first polymeric melt stream of vinylidene chloride copolymer in encapsulating means attached to said extrusion apparatus, and wherein said first melt stream is fed directly from said extrusion apparatus to said encapsulating means, whereby time of exposure of said vinylidene chloride copolymer to metal surfaces is minimized while the utilization of said transfer means provides for the combination of improvements of (i) flexibility in positioning said extrusion apparatus, and (ii) reduction of any thickness variations in said second melt stream about the circumference of said composite melt stream.

16. A method as in claim 6, said first melt stream is from plasticating a vinylidene chloride copolymer composition and is performed in extrusion apparatus, and including encapsulating said first polymeric melt stream in said encapsulator, wherein said encapsulator is attached to said extrusion apparatus, and wherein said first melt stream is fed directly from said extrusion apparatus to said encapsulator, whereby the time of exposure of said first melt stream of metal surfaces is minimized.

17. A method as in claim 7, said first melt stream is from plasticating a vinylidene chloride copolymer composition and is performed in extrusion apparatus, and including encapsulating said first polymeric melt stream in said encapsulator, wherein said encapsulator is attached to said extrusion apparatus, and wherein said first melt stream is fed directly from said extrusion apparatus to said encapsulator, whereby the time of exposure of said first melt stream to metal surfaces is minimized while the utilization of said transfer pipe provides for reduction of any thickness variations in said second melt stream about the circumference of said composite melt stream.

18. A method for processing polymers, comprising:
(a) plasticating a first polymeric composition and producing a first polymeric melt stream having a first viscosity;
(b) plasticating a second polymeric composition and producing a second polymeric melt stream having a second viscosity lower than the first viscosity;

(c) communicatively receiving said first and second melt streams in an encapsulator and encapsulating said first melt stream in said second melt stream to create a composite melt stream, wherein said first and second melt streams are not concentric with respect to each other when exiting said encapsulator; and
(d) receiving said composite melt stream from said encapsulator and improving the concentricity of said first and second layers in said composite melt stream.

19. A method for producing a plurality of coextruded film structures with extrusion apparatus, said method comprising:
(a) producing a first film structure by (i) plasticating a first sensitive polymeric composition in a first plasticating means and producing a first polymeric melt stream, ii) plasticating a second less-sensitive polymeric composition and producing a second polymeric melt stream, (iii) encapsulating said first melt stream in said second melt stream to create a third composite melt stream, (iv) passing said third melt stream through a transport means and feeding said third composite melt stream from said transport means into a first manifold in a multi-manifold die, whereby said first film structure is produced at said multi-manifold die;
(b) disconnecting said transport means from said first manifold of said die; and connecting said transport means to a second manifold of said multimanifold die, without moving said first plasticating means; and
(c) producing a second film structure by (i) plasticating a third sensitive polymeric composition in said first plasticating means and producing a fourth polymeric melt stream (ii) plasticating a fourth less-sensitive polymeric composition and producing a fifth polymeric melt stream, (iii) encapsulating said fourth melt stream in said fifth melt stream to create a sixth composite melt stream, (iv) feeding said sixth composite melt stream to second manifold in said multimanifold die, through said transport means, whereby said second film structure is produced at said multimanifold die, the structural composition of said second film structure differing from the structural composition of said first film structure.

20. A method as in claim 19 wherein said first and third sensitive polymeric compositions in steps (a) and (c) are different.

21. A method as in claim 19 wherein said first and third sensitive polymeric compositions in steps (a) and (c) both comprise vinylidene chloride copolymers.

22. A method as in claim 20 wherein said first and third sensitive polymeric compositions in steps (a) and (c) both comprise vinylidene chloride copolymers.

23. A method as in claim 1 wherein said encapsulating comprises annularly encapsulating by passing said first melt stream through a central bore in a crosshead mandrel, said crosshead mandrel comprising a crosshead groove, and including feeding said second melt stream in an annular configuration from said crosshead groove to said central bore.

* * * * *